United States Patent [19]

Tateishi

[11] Patent Number: 5,123,002

[45] Date of Patent: Jun. 16, 1992

[54] DISC PLAYER SERVO DEVICE

[75] Inventor: Kiyoshi Tateishi, Saitama, Japan

[73] Assignee: Pioneer Electric Corporation, Tokyo, Japan

[21] Appl. No.: 326,770

[22] Filed: Mar. 21, 1989

[30] Foreign Application Priority Data

Sep. 19, 1988 [JP] Japan .................. 63-234033

[51] Int. Cl.⁵ ............................................. G11B 7/00
[52] U.S. Cl. .............................. 369/44.32; 369/44.25; 369/44.29; 369/44.34; 369/44.35
[58] Field of Search ............... 369/44.11, 44.13, 44.25, 369/44.29, 44.32, 44.35, 43, 44.38, 54, 59, 32, 33; 360/44.34, 44.27, 78.04

[56] References Cited

U.S. PATENT DOCUMENTS

| | | | |
|---|---|---|---|
| 4,406,000 | 9/1983 | Shoji et al. ............ | 369/44.35 |
| 4,414,655 | 11/1983 | Shoji et al. ............ | 369/44.35 |
| 4,587,644 | 11/1986 | Fujiie .................... | 369/44.32 X |
| 4,689,779 | 8/1987 | Hayasei et al. ........ | 369/44.32 |
| 4,907,214 | 3/1990 | Nagano et al. ........ | 369/32 |

Primary Examiner—Roy N. Envall, Jr.
Assistant Examiner—Hung Dang
Attorney, Agent, or Firm—Sughrue, Mion, Zinn, Macpeak & Seas

[57] ABSTRACT

A servo device for a disc player detects when the level of an error signal formed according to the output signal of the pickup is equal to or higher than a predetermined value, to provide a detection output. The device also detects when the frequency of the error signal is equal to or higher than a predetermined value, to provide another detection output. Then, it is determined from these detection outputs whether, during the closure of the servo loop, an oscillation occurs within the servo system by the servo convergence or by external interruption, so that the oscillation of the servo system can be positively detected and servo convergence resumed. The system may be implemented in either hardware or software.

11 Claims, 3 Drawing Sheets

DISC PLAYER SERVO DEVICE

BACKGROUND OF THE INVENTION

This invention relates to a servo device for a disc player.

A disc player for playing data recording discs, such as video discs and digital audio discs (hereinafter referred to collectively as "discs", when applicable), essentially includes a tracking servo device for causing a data reading beam of the pickup to follow accurately the recording track, irrespective of eccentricity or other radial irregularity of the disc; and a focus servo device for accurately focussing the data reading beam on the data recording surface of the disk, irrespective of a bend or other depthwise irregularity of the disc.

In the tracking servo device, driving the data reading beam radially on the disc; i.e. a tracking operation, is carried out by a tracking actuator built into the pickup. Driving the objective lens along the optical axis for focusing the light beam; i.e., a focusing operation, is performed by a focus actuator built into the pickup. If the actuators have a small damping ratio, they vibrate, then the servo system may suffer from hunting; that is, the system may be oscillated by the failure of servo convergence or by external interruption. If the servo system oscillates in this manner, then the servo system will not complete its pull-in function. Therefore, it is essential to detect oscillation of the servo system to be able to resume servo convergence.

For this purpose, momentary level of the tracking error signal has conventionally been compared with a predetermined reference voltage ($\pm$Vth) by a window comparator and so forth. When the absolute value of the momentary level of the tracking error signal is higher than the reference voltage Vth, it is determined that the servo system is in oscillation, and servo convergence is carried out again. FIG. 5 shows a relationship between the tracking error signal and the reference voltage Vth. In FIG. 5 momentary level in negative polarity side of the tracking error signal is compared with the reference voltage having the absolute level Vth, so as to simplify the explanation.

However, such a method is disadvantageous because some of the discs are larger in error signal level than ordinary discs. In the playing of a disc with a larger error signal, if the absolute level of Vth is low, then, for instance, because of noises as indicated at A in FIG. 5, the servo system may be detected as if it were in oscillation. If the absolute level of Vth is high, then, in the case where a low-pass filter is employed to remove noise components from the error signal, the oscillation as indicated at B in FIG. 5 may not be detected.

As is apparent from the above description, if only the error signal level is used to detect the oscillation of the servo system, then it is very difficult to determine a suitable reference level Vth, and accordingly to detect accurately the oscillation of the servo system.

SUMMARY F THE INVENTION

Accordingly, an object of this invention is to provide a servo device for a disc player in which the oscillation of the servo system is positively determined, so that servo convergence can be quickly resumed.

The foregoing and other objects of the invention are achieved by a servo device for a disc player in which an error signal, formed according to the output of a pickup which reads recorded data from a data recording disc, is utilized to control the drive of the pickup, the device including a first detecting unit for detecting when the level of the error signal is equal to or higher than a predetermined reference level, to output a first detection signal; a second detecting unit for detecting when the frequency of the error signal is equal to or higher than a predetermined reference frequency, to output a second detection signal; and circuitry for detecting, from the first and second detection signals, the occurrence of oscillation within the servo system.

BRIEF DESCRIPTION OF THE DRAWINGS

The nature, principle and utility of the invention will become more apparent from the following detailed description when read in conjunction with the accompanying drawings, in which.

DETAILED DESCRIPTION OF THE PREFERRED EMBODIMENTS

A tracking servo device, which is one preferred embodiment of this invention, now will be described with reference to FIG. 1.

Figure 1:
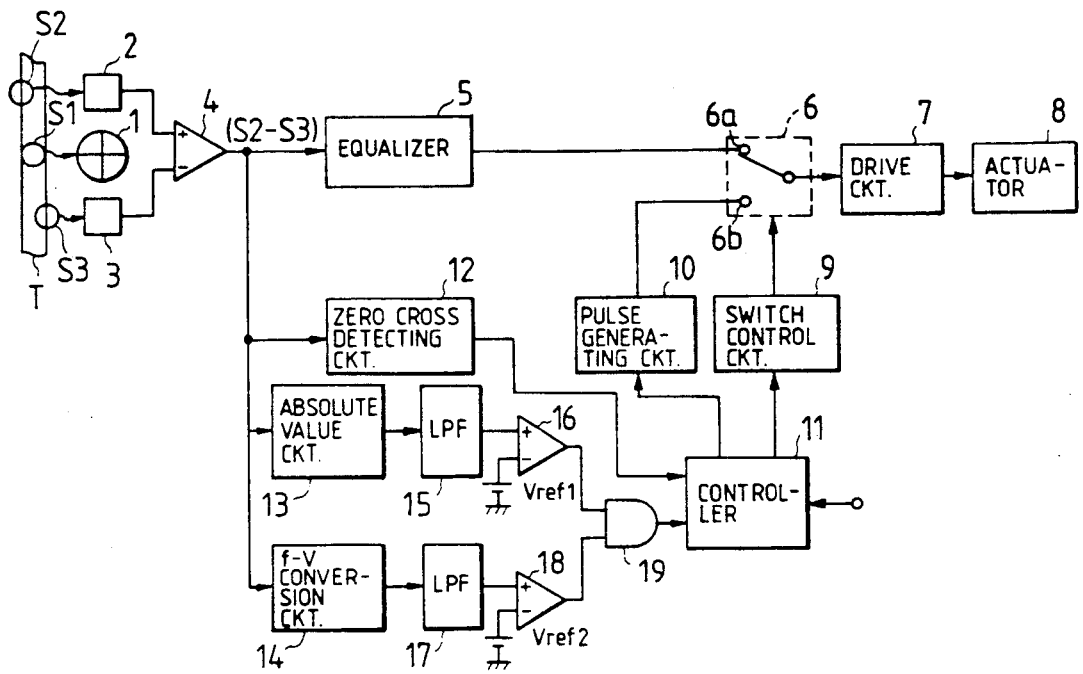
FIG. 1 is a block diagram showing one embodiment of a tracking servo device according to this invention.

Three beams S1, S2 and S3, formed by focusing laser beams, are applied to a recording track T on a disc by a pickup (not shown) so as to be positioned as shown in FIG. 1. The beam S1 is called "a recorded data reading beam", and the beams S2 and S3 are called "tracking data detecting beams". When the beam S1 moves relative to the disc, the beam S2 precedes beam S1, while the beam S3 follows the beam S1. The reflected light from these beams S1, S2 and S3 are applied to photo-electric conversion elements 1, 2 and 3, respectively.

The photo-electric conversion element 1 comprises four equal-size light receiving elements which are arranged to divide a light receiving surface into four equal parts by two perpendicular lines. The light receiving elements operate independently of one another. The sum of the outputs of the light receiving elements is a reading RF (high frequency) signal. On the other hand, the outputs of the pair of photo-electric conversion elements 2 and 3 are applied to a differential amplifier 4 which outputs a signal corresponding to a difference between them. The difference (S2−S3) is a tracking error signal.

Figure 2A:
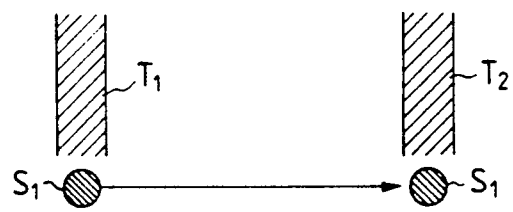
FIGS. 2(A) and 2(B) are explanatory diagrams showing relationships between the movement of a data reading beam and a tracking error signal with respect to recording tracks.
Figure 2B:
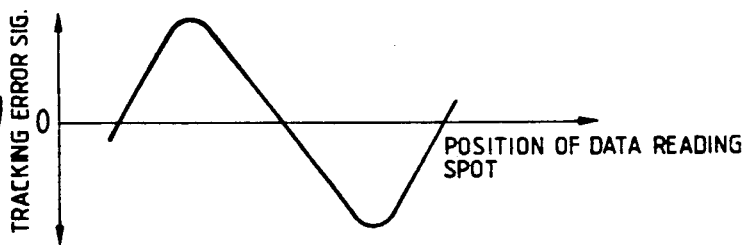

When, as shown in FIG. 2(A), the beam spots S1 through S3 move from a recording track T1 to the next track T2 driving a jumping operation, the waveform of the tracking error signal (S2−S3) is sinusoidal, as shown in FIG. 2(B), and the level is proportional to the deviation of the data reading S1 from a recording track T. The cross points correspond in position to the centers of adjacent recording tracks T1 and T2, and the middle of the distance between the centers of the adjacent recording tracks T1 and T2.

The tracking error signal (S2−S3) is applied to an equalizer 5, where its frequency characteristic is compensated. The output of the equalizer 5 is applied to a close contact 6a of a loop switch 6. The output of the loop switch 6 is applied through a drive circuit 7 to the actuator 8 of the pickup. The actuator 8 operates to displace the data reading beam S1 radially of the disc according to the tracking error signal so that the beam S1 accurately follows the recording track T. Thus, a tracking servo loop is formed.

The operation of the loop switch 6 is controlled by a switch control circuit 9. When the armature of the loop switch is tripped to the close contact 6a, a closed loop is established. When an open loop is set with the armature of the loop switch 6 tripped over to the open contact 6b, a jump pulse and a brake pulse which are opposite to each other in polarity are produced by a pulse generating circuit 10 with suitable timing, and are applied to the actuator 8, so that a jumping operation is carried out. The timing for generation of the jump pulse and the brake pulse is controlled by a controller 11. At the end of the jumping operation, the servo loop is closed again, and servo convergence is resumed.

The tracking error signal (S2−S3) is further applied to a zero cross detecting circuit 12, an absolute value circuit 13, and an f-V (frequency-to-voltage) conversion circuit 14. The zero cross detecting circuit 12 detects the zero-crossing point of the tracking error signal which, as shown in FIG. 2(B), occurs when the latter goes from positive to negative in the jumping operation, and provide a detection signal. The output detection signal of the zero cross detecting circuit 12 is supplied to a controller 11. The controller 11, comprising a microcomputer, in response to a jump instruction applied externally thereto and to the detection output of the zero cross detecting circuit 12, applies a loop switch operating timing signal to the switch control circuit 9, and a jump pulse generating timing signal and a brake pulse generating timing signal to the pulse generating circuit 10.

The absolute value circuit 13 obtains the absolute value of a tracking error signal level. The output of the absolute value circuit 13 is applied to an LPF (low-pass filter) 15, where noise components are removed from that output. The output of the LPF 15 is applied to a comparator 16, where it is compared with a predetermined reference level Vref1. When the absolute value of the tracking error signal level is equal to or higher than the reference level Vref1, the comparator 16 provides a "H" (high) level comparison output; and when it is lower, the comparator provides an "L" (low) level comparison output. These circuit elements form a first detecting unit for detecting when the tracking error signal level is equal to or higher than the reference level Vref1.

The f-v conversion circuit 14 converts the frequency of a tracking error signal into a voltage. The output of the circuit 14 is applied to an LPF 17, where noise components are eliminated from the output. The output of the LPF 17 is applied to a comparator 18, where it is compared with a reference level Vref2 corresponding to a predetermined reference frequency fref. When the tracking error signal frequency is equal to or higher than the reference frequency fref, the comparator 18 provides an "H" level comparison output; and when it is lower, the comparator 18 provides an "L" level comparison output. These circuit elements form a second detecting unit for detecting when the tracking error signal frequency is equal to or higher than the reference frequency fref.

The comparison outputs of the comparators 16 and 18 are applied to an AND gate 19. When both of the outputs of the comparators 16 and 18 are high, i.e., when the level of the tracking error signal is equal to or higher than the reference level Vref1 and the frequency thereof is equal to or higher than the reference frequency fref, the AND gate 19 provides an "H" level output to the controller 11 as a detection output indicating that, during the closure of the servo loop, oscillation has occurred within the servo system by the servo convergence, or by external disturbance. In response to such a detection output, the controller 11 determines that the servo system is oscillated in the above-described manner, and opens the servo loop, thus allowing servo convergence to resume. More specifically, the controller 11 controls the switch control circuit 9 so that the armature of the loop switch 6 is tripped over to the open contact 6b, and is tripped over to the close contact 6a, for instance, with the zero cross detection timing of the zero cross detecting circuit 12; that is, the servo loop is closed and servo convergence is resumed.

Figure 3:
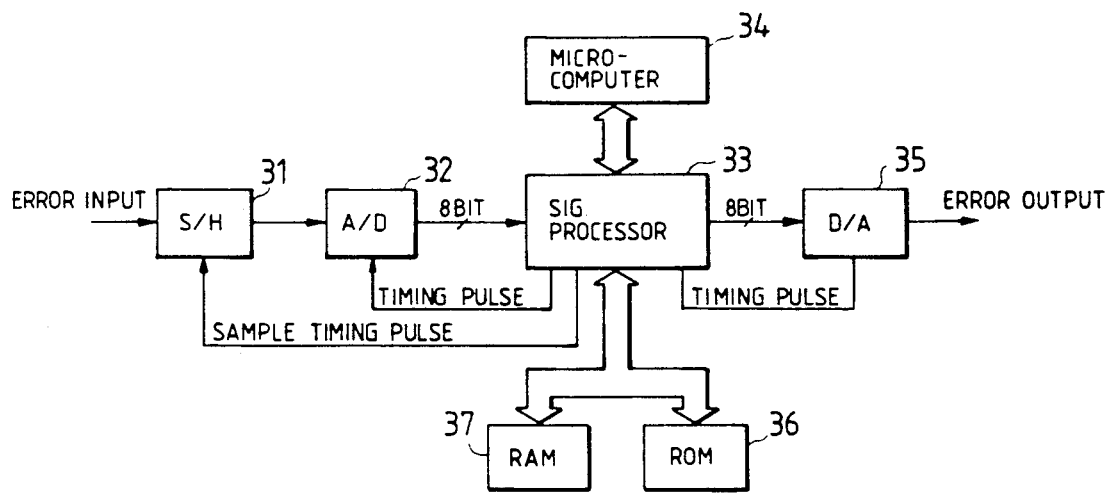
FIG. 3 is block diagram showing another embodiment of the invention, in which a signal processing operation is carried out with software by using a signal processor.
Figure 5:
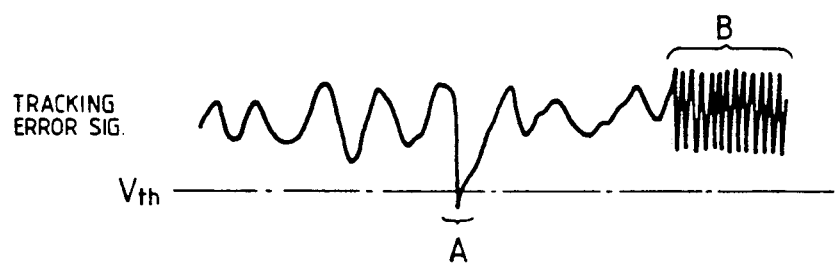
FIG. 5 is a waveform diagram describing the detection of oscillation with a servo system using only an error signal level.

In the above-described embodiment, the signal processing operation is performed with hardware; however, it may be achieved with software by using a signal processor as shown in FIG. 3.

In FIG. 3, the tracking error signal is applied to a sample and hold circuit 31, where it is sampled. The output of the sample and hold circuit 31 is applied to an A/D (analog-to-digital) circuit 32, where it is digitized. The output of the A/D circuit 32 is applied, for instance, as 8-bit data, to a signal processor 33. The signal processor 33, under control of a microcomputer 34, compensates for the frequency characteristic of the tracking error signal, the zero cross detection of the tracking error signal, the formation of the jump pulse and the brake pulse for the jumping operation, and the detection of the level and frequency of the tracking error signal in servo convergence after the jumping operation. The 8-bit output data of the signal processor 33 is applied to a D/A (digital-to-analog) converter 35, where it is converted into analog data which is applied, as a drive input, to the drive circuit 7 (FIG. 1). The signal processor 33 applies a sample timing pulse to the sample and hold circuit 31, an A/D timing pulse to the A/D converter 32, and a D/A timing pulse to the D/A converter 35. Predetermined data have been stored in a ROM (read-only-memory) 36. Data provided during the signal processing operation are temporarily stored in a RAM (random access memory) 37.

Figure 4:
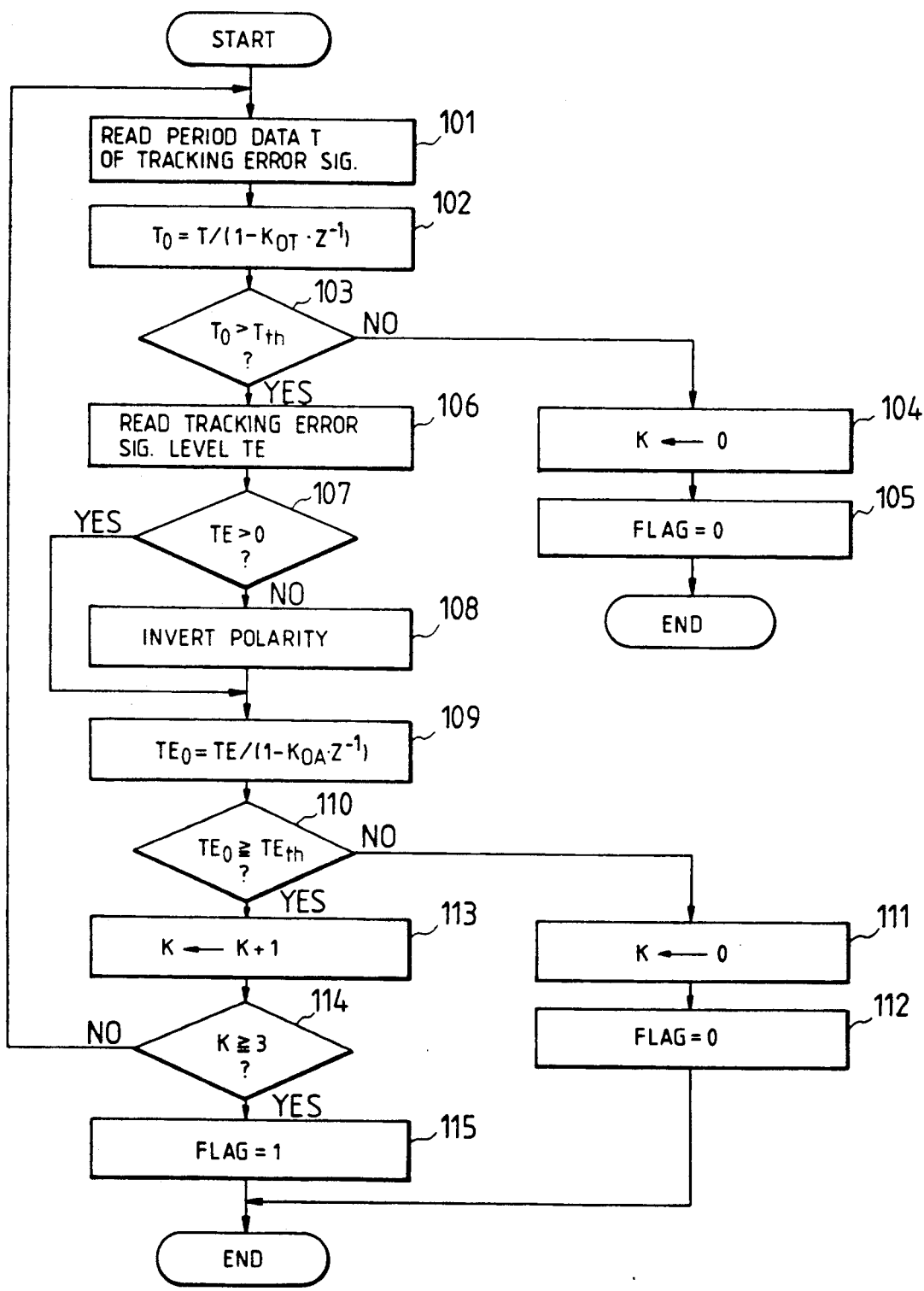
FIG. 4 is a flow chart showing a procedure for detecting an oscillation with a servo system in servo convergence according to the invention.

A procedure for detecting the oscillation of the servo system which may occur with the servo convergence during the closure of the servo loop now will be described with reference to a flow chart of FIG. 4.

First, the time width data of the zero cross timing period of the tracking error signal is read as the period data T of the tracking error signal (Step 101). Then, the period data T is filtered using the filtering operation $T/(1-K_{OT}Z^{-1})$; then, the same operation as that of the LPF 17 in FIG. 1 is performed to obtain period data $T_O$ having no noise components (Step 102). In the above-described expression, $K_{OT}$ is a constant, and $Z=e^{ST}$ (for instance, $T=31.78$ μsec). Thereafter, it is determined whether or not the period data $T_O$ is equal to or lower than a frequency threshold value Tth; that is, it is determined whether or not the tracking error signal frequency is equal to or higher than the reference frequency (Step 103). If not, then the number K of decision times is reset (Step 104), and an oscillation decision flag indicating the oscillation of the servo system is reset (FLAG=0) (Step 105).

When it is determined that the tracking error signal frequency is equal to or higher than the reference frequency, the A/D converted tracking error signal level TE is read (Step 106). It is determined whether or not the tracking error signal level TE is positive in polarity (Step 107). If not, the polarity is inverted (Step 108). Thus, the absolute value of the tracking error signal level TE can be obtained. Then, a filtering operation $TE/(1-K_{O4}Z^{-1})$ is performed; that is, the same operation as that of the LPF 14 in FIG. 1 is performed, so that an error signal level $TE_O$ having no noise components is obtained (Step 109). In the above-described expression, $K_{O4}$ is a constant. Thereafter, it is determined whether or not the error signal level $TE_O$ is equal to or higher than an error signal level threshold value TEth (Step 110). If not, the number K of decision times is reset (Step 111), and the oscillation decision flag is reset (Step 112).

When it is determined that the error signal level $TE_O$ is equal to or higher than the threshold value TEth, the number K of decision times is incremented (Step 113). Under this condition, it is determined whether or not K is equal to or larger than, for instance, three (K ≧ 3); that is, it is determined whether or not, when the tracking error signal frequency is equal to or higher than the reference frequency, the number of times this has occurred is three or more (in this embodiment; alternatively, the number need not be limited to three) (Step 114). If not, Step 101 is carried out again, and the above-described operations are carried out again. If it is determined that the number of decision times is equal to or more than three, then the oscillation decision flag is set (FLAG=1) (Step 115). As a result, it is determined that, during the closure of the servo loop, oscillation has occurred within the servo system by servo convergence or by external disturbance, and servo convergence is resumed.

While the tracking servo device has been described as one embodiment of this invention, the invention is not limited thereto or thereby. The technical concept of the invention is applicable, for instance, to a focus servo device.

As described above, with the disc player servo device of the invention, it is detected whether or not an error signal level is equal to or higher than a predetermined reference level, and it is also detected whether or not the error signal frequency is equal to or higher than the predetermined reference frequency. Then, it is determined from the two detection outputs that, during the closure of the servo loop, oscillation is occurring with the servo system by servo convergence or by external disturbance. Therefore, oscillation of the servo system can be positively determined, and servo convergence can be resumed quickly.

What is claimed is:

1. A servo device for a disc player in which an error signal, formed according to an output of a pickup which reads recorded data from a data recording disc, is utilized to control the driving of said pickup, the servo device comprising:

first detecting means for detecting when a level of said error signal is equal to or higher than a predetermined reference level, and outputting a first detection signal accordingly;

second detecting means for detecting when a frequency of said error signal is equal to or higher than a predetermined reference frequency, and outputting a second detection signal accordingly;

means for detecting, based on both said first and said second detection signals, an occurrence of oscillation within a servo system thereof and outputting a servo detection signal accordingly; and means, connected to said detection means, for controlling an operation of said servo device in accordance with said servo detection signal.

2. A servo device as claimed in claim 1, wherein said first detecting means comprises:

an absolute value circuit for obtaining the absolute value of said error signal and outputting an absolute value signal accordingly; and a comparator for comparing a level of said absolute value signal with said predetermined reference level and outputting said first detection signal accordingly.

3. A servo device as claimed in claim 1, wherein said second detecting means comprises:

conversion means for converting the frequency of said error signal into a voltage; and a comparator for comparing said voltage with a reference level corresponding to said predetermined reference frequency and outputting said second detection signal accordingly.

4. A servo device as claimed in claim 2, further comprising a low-pass filter, interposed between said absolute value circuit and said comparator, for filtering out noise components from said absolute value signal.

5. A servo device as claimed in claim 3, further comprising a low-pass filter interposed between said conversion means and said comparator for filtering out noise components from said voltage.

6. A servo device for a disc player in which an error signal, formed according to an output of a pickup which reads recorded data from a data recording disc, is utilized to control the drive of said pickup, the servo device comprising:

means for digitizing said error signal to produce a digitized error signal;

a read-only memory for storing predetermined data;

signal processing means for receiving said digitized error signal and for compensating for at least a frequency characteristic and a level of said error signal, in accordance with said predetermined data, said signal processing means counting a number of times said frequency characteristic and said error signal level exceed respective predetermined levels, and instructing the servo device to perform servo convergence in accordance with said number.

7. A servo device according to claim 6, wherein said predetermined data includes a count to which said number is compared, said servo convergence being effected when said number is at least as large as said count.

8. A servo device according to claim 7, wherein said count is three.

9. A servo device according to claim 6, wherein said predetermined data includes digital filtering data for removing noise elements from said digitized error signal.

10. The servo device of claim 1, further comprising means for switching the operation of said device to a servo loop if the oscillation does not occur, and wherein said error signal level is a voltage level.

11. A servo device for a disc player in which an error signal, formed according to an output of a pickup which reads recorded data from a data recording disc, is utilized to control the driving of said pickup, the servo device comprising:

- a level detector for detecting when a level of said error signal is equal to or higher than a predetermined reference level, and outputting a level detection signal accordingly;
- a frequency detector for detecting when a frequency of said error signal is equal to or higher than a predetermined reference frequency, and outputting a frequency detection signal accordingly;
- an oscillation detector for detecting, based on both said level and frequency detection signals, an occurrence of oscillation within a servo system thereof and outputting a servo detection signal accordingly; and
- a controller, connected to said oscillation detector, for controlling an operation of said servo device in accordance with said servo detection signal.

* * * * *